United States Patent [19]
Cheng

[11] 3,877,876
[45] Apr. 15, 1975

[54] CARBON BLACK APPARATUS

[75] Inventor: Paul J. Cheng, Bartlesville, Okla.

[73] Assignee: Phillips Petroleum Company, Bartlesville, Okla.

[22] Filed: Aug. 30, 1972

[21] Appl. No.: 284,702

[52] U.S. Cl............................. 23/259.5; 423/456
[51] Int. Cl........................... C09c 1/50; C09c 1/48
[58] Field of Search................................... 23/259.5

[56] References Cited
UNITED STATES PATENTS

| 2,682,450 | 6/1954 | Sweigart et al. | 23/259.5 |
| 2,813,138 | 11/1957 | MacQueen | 260/673 |
| 2,851,337 | 9/1958 | Heller | 23/259.5 |
| 3,660,039 | 5/1972 | Henderson | 23/259.5 |
| 3,681,031 | 8/1972 | Johnson | 23/259.5 |

Primary Examiner—Morris O. Wolk
Assistant Examiner—Roger F. Phillips

[57] ABSTRACT

A method and apparatus in which a first mixture of hydrocarbon feed and fuel-rich combustion gases is formed at a temperature just less than the decomposition of the feed and oxygen-rich combustion gases are then introduced to form a mixture in which the feed decomposes to form carbon black.

4 Claims, 6 Drawing Figures

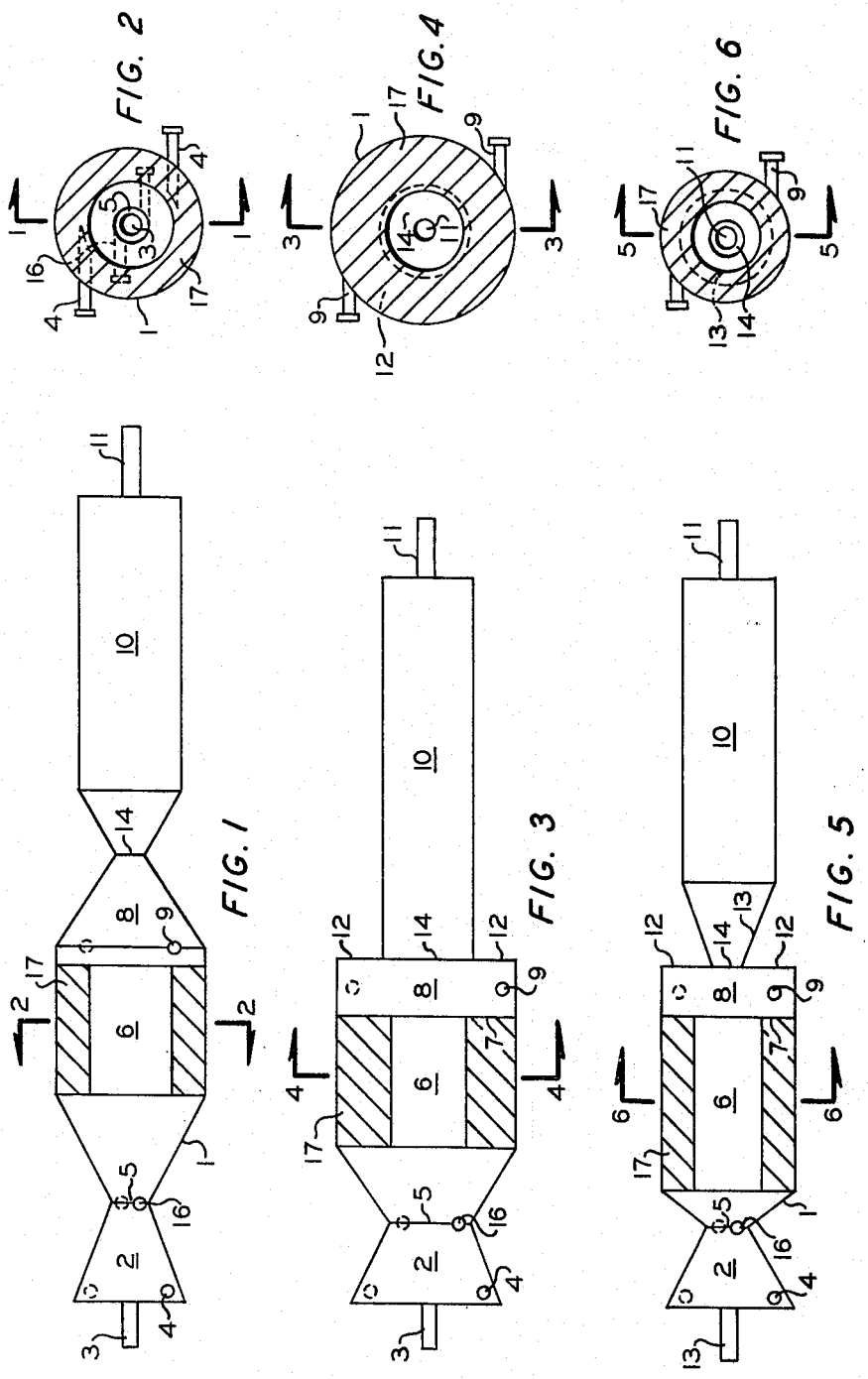

CARBON BLACK APPARATUS

This invention relates to a method and to apparatus for producing carbon black.

In one of its more specific aspects, this invention relates to a method and to apparatus for producing carbon black which involve separate preheat and separate carbon black forming zones.

Conventional furnace black processes involve contacting a hydrocarbon feed with hot combustion gases to raise the feed to its pyrolytic decomposition temperature. While the feed is usually preheated, this contact nevertheless necessitates raising the feed temperature about 1,000°F, for example, in a very short period of time, generally less than a second. This requirement, coupled with the flame geometry, creates highly nonuniform reaction conditions since not all of the feed is heated up uniformly. The method and apparatus of the present invention seek to solve this problem by establishing more homogeneous reaction conditions.

According to the method of the present invention, the process of producing carbon black is divided into two stages, a preheat stage and a carbon-forming stage. In the first stage, the hydrocarbon is heated by contact with hot combustion gases to a temperature just below carbon black formation temperature, that is, within the range of about 1,600° to about 1,900°F. In the second stage, the hydrocarbon is heated by contact with hot combustion gases to a temperature of greater than 2,200°F where decomposition of the hydrocarbon to carbon black readily occurs.

To accomplish this, production is carried out in a two-stage reactor. In the first section, fuel-rich hot combustion gases are tangentially introduced to mix with the hydrocarbon feed which is preferably introduced axially. Because of the temperature and the substantial absence of free oxygen in the first section, substantially no combustion of hydrocarbon takes place; the feed is heated up to a temperature less than that temperature at which any substantial production of carbon black occurs, that is, to a temperature preferably within the range of 1,600° to 1,900°F. This section is preferably formed of a venturi configuration to insure thorough mixing and heating of the first mixture.

The first mixture formed in the first section is then passed through a first mixing section which comprises a restriction, such as a choke, to insure further mixing and into a second section into which oygen-rich hot combustion gases are introduced tangentially into contact with the first mixture. This contact forms a second mixture by raising the temperature of the first mixture to carbon black-forming temperature, that is, to about or above 2,200°F. This latter heating is done rapidly.

The second mixture thusly formed is passed, preferably, through a second mixing section and into a reaction section in which the principal portion of the carbon black is formed and from which the carbon black is recovered.

The apparatus and method of this invention are further explained in conjunction with the attached figures in which FIG. 1 illustrates one embodiment of the reactor in longitudinal cross section 1–1 of FIG. 2, and FIG. 2 illustrates the reactor in cross section through section 2—2 of FIG. 1. FIGS. 3 through 6 illustrate other embodiments of the reactors.

It will be understood that, in general, conventional hydrocarbon feeds, fuels and oxidants, such as conventionally employed in carbon black manufacture, will be employed in the method of this invention.

Referring now to FIG. 1, there is shown reactor 1 comprised of first section 2 into which hydrocarbon feed is axially introduced through conduit 3, some small amount of air being introduced in conjunction therewith, if desired, to maintain the hydrocarbon conduit carbon-free. At least one fuel-rich combustion stream is introduced through ports 4, preferably tangentially, into the section to mix with the axially-introduced hydrocarbon feed. The fuel-rich stream is fuel-rich in that it contains substantially no free oxygen but does contain uncombusted fuel. The fuel-rich stream, which can be introduced as a single stream or in a plurality of streams, is introduced in sufficient quantity and at such a temperature that the mass established in zone 2 is raised to a temperature just less than the temperature to form carbon black from hydrocarbon feed, that is, to a temperature within the range of about 1,600° to 1,900°F.

The first zone need not be of constant diameter but can have its walls adapted such that venturi 5 is formed therein. Inasmuch as this venturi acts to provide further mixing, its dimensions are of no particular significance. Relatedly, along the converging walls, the diverging walls or at the throat as shown, nozzles 16 can be positioned for the purpose of introducing additional fuel-rich gases.

The mass formed in the first section is then passed through a first mixing section 6 comprising a restriction such as a choke 17 which can be of any size and configuration which provides additional mixing without the expenditure of too great a pressure drop.

The outlet of the first mixing section will form the upstream wall 7 of combustion zone or second section 8. Into this section, through nozzles 9 in a manner comparable to that described in U.S. Pat. No. 2,564,700, introduction of oxygen-rich combustion gases is made, preferably tangentially, at such temperatures as to bring the entering mass to carbon black-forming temperature, that is, to about, or above, 2,200°F, the reactant mass so formed being of such composition as is conventional in the furnace carbon black process. This reactant mass is then conducted, optionally, into a second mixing section 14 and into reaction section 10 in which a principal portion of the carbon black is formed and from which carbon black is recovered through nozzle 11.

Combustion zone 8 can be of any configuration at its downstream end. It can gradually decrease in diameter as shown in FIG. 1 or it can abruptly decrease in diameter as shown in FIG. 3 where its downstream walls 12 are positioned substantially perpendicular to the longitudinal axis of the reactor to form a second mixing section. Or, as shown in FIG. 5, the downstream walls 12 of the combustion zone can be positioned substantially perpendicular to the longitudinal axis of the reactor to form the second mixing section, the upstream walls 13 of the reaction section diverging outwardly therefrom to form reaction section 10 having a diameter greater than the diameter of the opening thereinto.

It is to be understood that in the foregoing discussion, the term "combustion gases" is employed in relation to gases produced by the combustion of a fuel, preferably natural gas, with a free oxygen-containing gas, preferably air. Such gases can be formed outside of the reactor and introduced thereinto, or the fuel and the oxidant can be introduced into the reactor and the combustion gases can be produced therein.

It will be further understood that the term "fuel-rich" combustion gases refer to combustion gases containing a quantity of uncombusted fuel, that is, they are produced from a mixture of fuel and oxidant which contains the oxidant in an amount insufficient to oxidize all of the fuel present in the mixture. Preferably, the fuel-rich mixture will contain from about 70 to about 95 volume percent of the stoichiometric quantity of air.

Similarly, "oxygen-rich" combustion gases refer to combustion gases containing a quantity of oxygen, that is, they are produced from a mixture of fuel and oxidant which contains the oxidant in an amount more than sufficient to oxidize all of the fuel present in the mixture. Preferably, the oxygen-rich mixture will contain from about 110 to about 180 volume percent of the stoichiometric quantity of oxidant, air or oxygen.

The total quantity of the combustion gases will be sufficient to bring the feed to decomposition temperature. The relative quantity of the two combustion gases will be such that the oxygen contained in the oxygen-rich gases oxidizes the fuel contained in the fuel-rich gases. The total quantity of oxygen also be sufficient to establish a sufficient excess of oxygen in the smoke so as to appreciably after-treat the carbon black contained therein while, at the same time, bringing the photoelometer of the black to a desired value.

It will be evident from the foregoing that various modifications can be made to the method of this invention. Such are considered, however, to be within the scope hereof.

What is claimed is:

1. A longitudinally disposed tubular carbon black reactor comprising:
   a. a preheating section, the interior of which has the shape of a venturi;
   b. a first mixing section comprising a restriction portion in open axial communication with said preheating section;
   c. a combustion section in open axial communication with said first mixing section;
   d. a second mixing section in open axial communication with said combustion section, said second mixing section having a decreased diameter compared to said combustion section;
   e. a reaction section in axial and open communication with said second mixing section;
   f. first means connected to the preheating section for the introduction of hydrocarbon feed into said preheating section;
   g. second means connected to said preheating section for tangential introduction of fuel-rich hot combustion gases into said preheating section;
   h. third means connected to said combustion section for tangential introduction of oxygen-rich hot combustion gases into said combustion section; and
   i. fourth means connected to said reaction section for withdrawal of the carbon black formed from the reactor.

2. A carbon black reactor in accordance with claim 1 wherein said preheating section has openings for the introduction of reactants proximate to the throat of said venturi.

3. A carbon black reactor in accordance with claim 1 wherein said second mixing section is shaped in the form of a venturi.

4. A carbon black reactor in accordance with claim 1 wherein said first means are arranged for axial introduction of hydrocarbon feed.

* * * * *